United States Patent [19]

Venturini

[11] Patent Number: 4,972,108
[45] Date of Patent: Nov. 20, 1990

[54] HIGH SPECIFIC THRUST LINEAR MOTOR

[75] Inventor: Marco Venturini, Genova, Italy

[73] Assignee: Phase s.r.l., Genoa, Italy

[21] Appl. No.: 373,132

[22] Filed: Jun. 29, 1989

[30] Foreign Application Priority Data

Jul. 1, 1988 [IT] Italy ................. 21186 A/88

[51] Int. Cl.⁵ .......................... H02K 41/00
[52] U.S. Cl. ................................... 310/12
[58] Field of Search ............... 310/12, 13, 14; 318/138

[56] References Cited

U.S. PATENT DOCUMENTS 4,709,175 11/1987 Nakagawa .................. 310/12
4,761,574 8/1988 Nakagawa .................. 310/12

FOREIGN PATENT DOCUMENTS 3543043 6/1986 German Democratic Rep. ... 310/12
0249862 12/1985 Japan ........................ 310/12
0081967 4/1987 Japan ........................ 310/12

Primary Examiner—Steven L. Stephan
Assistant Examiner—Judson H. Jones
Attorney, Agent, or Firm—Browdy and Neimark

[57] ABSTRACT

An electronically switched linear motor with high specific thrust characterized by large mechanical air gaps and by the absence of side thrust components. The motor can be completed by a built in linear sensor of the position. The generation of a high thrust is obtained through the effect of variable reluctance of two stator indented rails, whereas the side (sideway) thrust balancing is achieved thanks to a dual air gap symmetrical construction.

7 Claims, 3 Drawing Sheets

HIGH SPECIFIC THRUST LINEAR MOTOR

BACKGROUND OF THE INVENTION

This invention relates to an electronically switched linear motor producing a high specific thrust or push, possibly incorporating a position sensor, and which is particularly adapted to realize linear actuators of the high precision type and with wide operating range.

Many applications require the use of linear actuators. More particularly, in the fields of industrial automation, robotics, and machine tools control, the need is common for realizing the movements of linear actuation in a rigid and precise manner, with a device that is as fast and insensible to environment and load changes as possible.

According to the actual technique, in most applications the linear actuating movement is obtained either by means of a hydraulic or pneumatic cylinder -for applications requiring moderate speed and precision- or by means of an electric actuator in order to obtain the maximum of speed and control bandwidth. Such electric actuator is generally made up by a high performance servomotor (e.g. a D.C. or a brushless motor) that transmits the rotating motion through a torque limiting coupling device to a balls-circulating screw converting the rotation movement into a rectilinear motion. The system is completed by a position sensor in the motor axis for measuring the position of the actuated member. This embodiment does not allow for a high precision since the errors or the screw and of the associated bearings cannot be corrected.

According to an alternative embodiment, quite less frequent since more costly, the position sensor is of the linear type and is carried by the actuated member. Such solution is more precise, but is limited by tne transmission elasticity which generates a resonance frequency of the kynematic chain, as a function of the mass of the load, which sets an upper limit for the bandwidth of the control system.

The use of an electric linear motor would permit to eliminate the above mentioned drawbacks by making the system theoretically simpler and eliminating the elasricity and the resonance effects which are typical of the transmission. However this solution has been used only in a very limited number of applications by reason of the peculiar characteristics of the linear motors presently available which are characterized by:

(1) Very low thrust/mass and thrust/mass ratios which render the motors intrinsically not very dynamic;

(2) High parasitic thrust orthogonal to tne useful thrust, and usually equal to many times this letter; this phenomenon causes stresses and wear in the bearings and often requires the use of expensive support systems, such as fluidostatic bearings, thus causing often an undue expense and duplication of the normal linear supports of tne actuated slider;

(3) Very reduced air gaps, typically in the order of a few hundredths of millimeters, which make their manufacturing difficult and costly.

To the above listed disadvantages it is to be added that a linear position sensor, which too is very costly, is to be provided for when using a linear motor.

SUMMARY OF THE INVENTION

It is therefore an object of the present invention that of realizing a hybrid linear motor, that is a linear motor with permanent magnets and also with reluctance, which provides for a high specific thrust per mass and size unit, with the absence, or the balancing, of every side thrust, which allows for a large mechanical air gap and which incorporates, if desired, a position linear sensor made up by the same basic components of the motor.

These objects are achieved thanks to a linear motor comprising two parallel rails and a rotor which is movable therebetween, characterized in that said rails are of a low loss ferromagnetic material, and laminated parallel to their plane, each carrying a series of regular indentations with an even pitch, the indentations being facing to each other and staggered by half pitch along the longitudinal direction, and in that the rotor comprises a plurality of identical pieces that are longitudinally staggered, each realizing a phase or a part of a phase.

The linear motor according to the present invention provides for a multi-phase structure with permanent magnets wherein the thrust available is amplified by the effect of the variable reluctance of an indented structure, as well as of two facing air gaps through which passes the same magnetic flux generated by the permanent magnets. Additionally, both the permanent magnets and the windings are received on the member with limited length so that the portion of the motor having an extended length is only formed by a stack of laminations or a set of etched or indented steel rails.

BRIEF DESCRIPTION OF THE DRAWINGS

The invention will now be disclosed with reference to a non limiting embodiment shown in FIGS. 1-3 illustrating the magnetic circuit, both in plan view and in cross section view, the support structure being omitted, of a complete machine able to deliver a thrust in the order of 1,000 N.

DESCRIPTION OF PREFERRED EMBODIMENT

Figure 1:
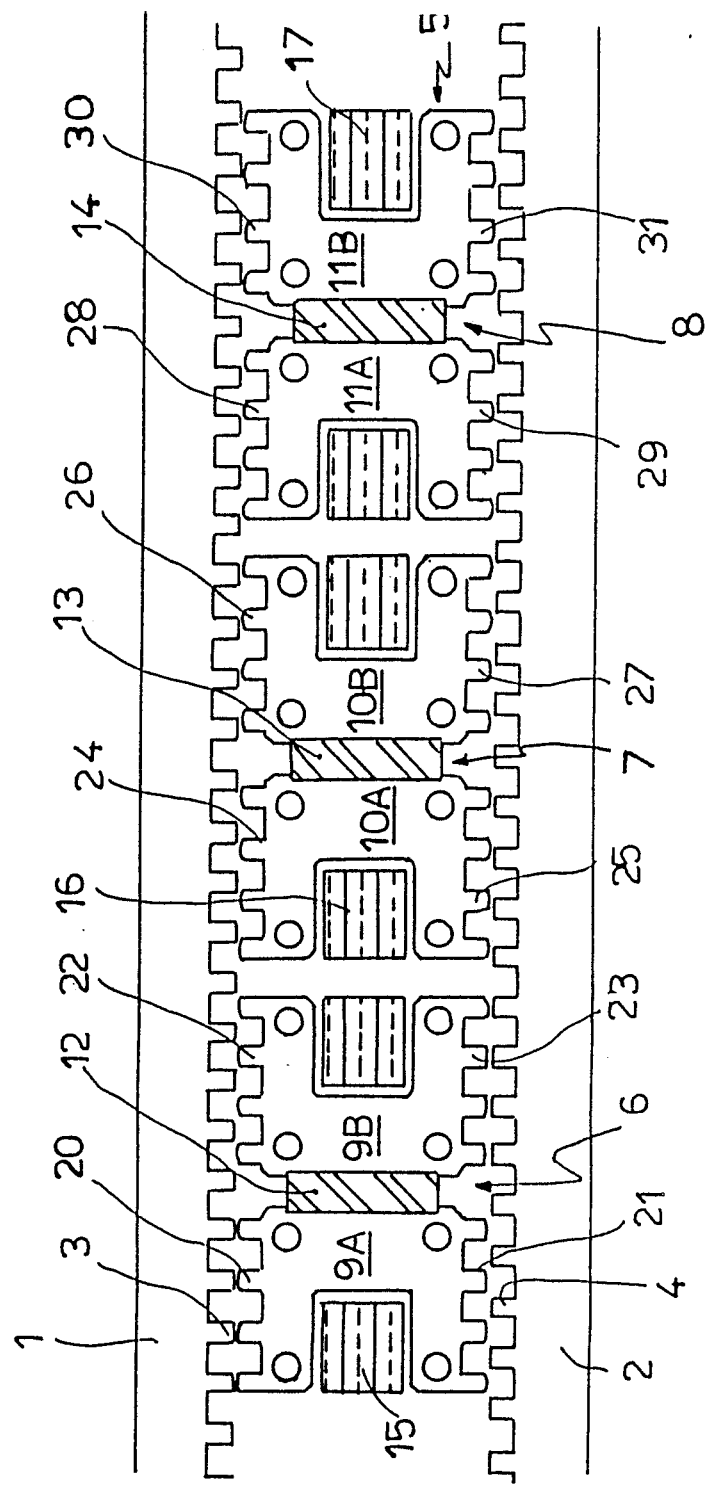

Although the description refers to a three-phase motor, the invention is not limited to this number of phases.

According to the prior art, a linear motor comprises a member having an undefined length determined by the particular application, hereinafter called stator, and a member having a well defined length which does no depend upon the length of motion of the actuator, hereinafter called rotor. Such currently employed names are only conventionals and do not refer to the real motion that can be imparted to one member or to the other. The present techniques provide for a stator made up either by permanent magnets or by a laminated structure carrying short-circuit windings, in analogy with the construction either of synchronous or D.C. motors or of asynchronous motors respectively.

According to another technique, the stator is made up by a single strip or rail of ferromagnetic material carrying a series of notches or indentations. The rotor is made up by a few electromagnets having an arcuated shape and carrying similar indentations, staggered in respect of each other. The motor operation is obtained by sequentially activating the electromagnets, each of them tending to align its indentations with the stator rail.

It has further been proposed a construction named "hybrid", wherein the electromagnets are assisted by a permanent magnet and wherein the motor current only aims to modulate the attraction force of the hybrid electromagnet. It is evident from the above that the thrust generated by a motor so built, conventionally named reluctance motor, is much smaller than the attraction force between electromagnets and rail.

According to the present invention, the stator comprises two facing rails 1, 2 of low loss ferromagnetic material, each carrying a series of regular indentations 3, 4 respectively, each having the same pitch and in the disclosed example equal to 10 mm, and being positioned with the facing indentations longitudinally displaced by half pitch (i.e. 5 mm in this example). The space between the two rails is that covered by the rotor in its movement; such member generally indicated at 5 is made up by a plurality of longitudinally staggered equal pieces 6, 7, 8, each one forming a phase or a part of a phase; each piece in turn being made up by two polar shoes 9A, 9B, 10A, 10B, 11A, 11B of a low loss ferromagnetic material which is laminated parallel to the plane of the drawing, having a thickness equal to that of the rails and carrying on both sides an indented profile, 20-31 respectively, with the same pitch of the rails.

The pole shoes in turn enclose a permanent magnet, 12, 13 and 14 respectively, and are surrounded by a winding (15, 16, 17) the plane of which is parallel to the longitudinal axis of the machine and orthogonal to the plane of the rails.

Figure 2:
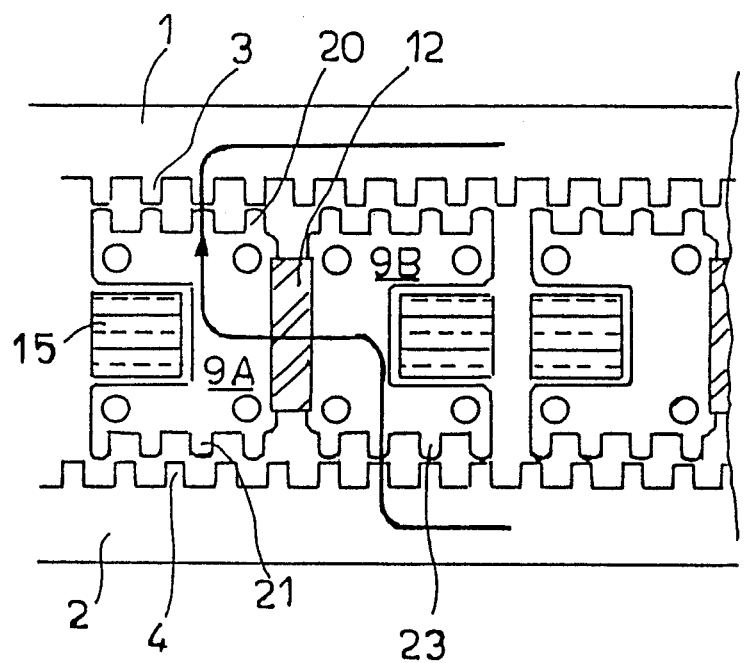
Figure 3:
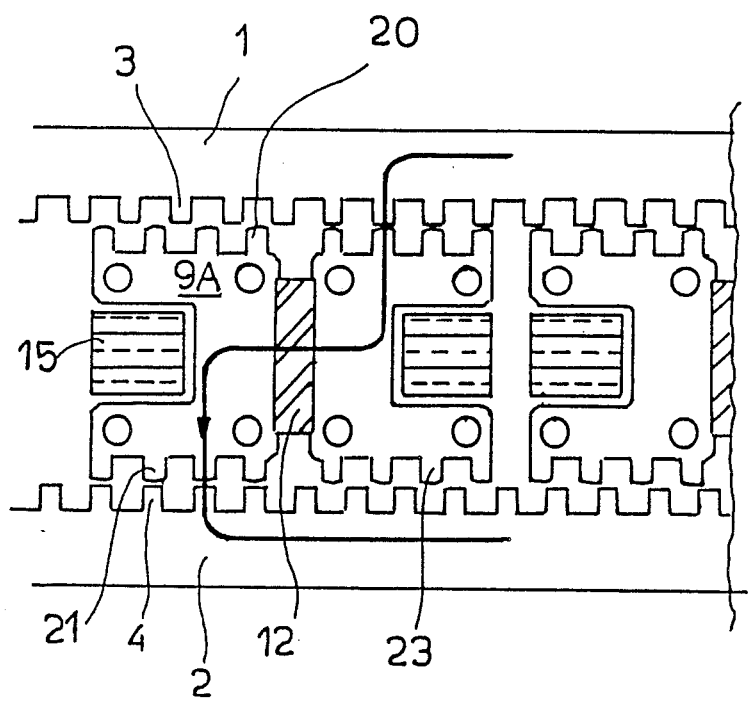

In order to understand the operation of the machine, two positions of the rotor 5 in its movement of translation within the stator 1, 2, shown in FIGS. 2 and 3, can be considered. In the position illustrated in FIG. 2, and with reference to piece 6, the indentations 20 and 23 of the rotor coincide with those of the stator 3 and 4, whereas the indentations 21 and 22 appear to be in phase opposition; consequently the magnetic flux generated by the permanent magnet 12 follows the path 23, 12, 20 shown with enlarged line passing through the winding 15 upwardly.

In an intermediate position between that of FIG. 2 and that of FIG. 3, the reluctance of both indentations is equal, and therefore the magnetic flux has no axial component: therefore the flux linked to the winding 15 is null.

Finally, in the position shown in FIG. 3, the magnetic flux follows the path 22, 12, 21 and therefore passes through the winding 15 downwardly. It is therefore easY to understand that an electromotive force is developed in winding 15 with a frequency equal to the number of indentation patches passed in the time unit. Since the amplitude of the electromotive force depends upon the total flux linked and upon the frequency, it is possible to increase the e.m.f, and therefore the thrust (being known that the voltage constant and the thrust constant are intrinsically proportional in a synchronous machine) without changing the machine sizes. The lower limit for the indentation pitch depends upon the the sizes of the required mechanical air gap; namely, a pitch of the order of the mechanical air gap would make insignificant the reluctance differences which are exploited to generate an electromotive force. Finally, a proper profile of the rotor and/or stator indentation would allow for a control of the waveform of the electromotive force; to obtain the best uniformity of motion the sinusoidal waveform should be preferred. This requires an arcuate profile of the rotor indentations from 20 to 31, as can be seen in FIG. 1.

A three-phase machine (FIG. 1) is realized quite simply by juxtaposing the three above illustrated elementary modules 6, 7, 8 mechanically staggered in the longitudinal direction by an integer number of indentation pitches, augmented by one third and two thirds of pitch respectively. The magnetic flux generated by three modules 6, 7, 8 in the two stator rails 1, 2 results from the composition of the three fluxes, each from a corresponding module and having a sinusoidal main component, which are out of phase by 120 electric degrees; their sum is therefore null and consequently no return path for the flux is required between the rails. This compensation of the flux represents an advantage which is not present in the conventional rotating electric machines. The feature is similar to the construction of three-phase electric transformers wherein no return path to the flux is required between the two magnetic yokes of the transformer.

The described machine can be considered like a permanent magnet synchronous machine with a linear construction; therefore it will be possible to drive the same by means of an electronic drive circuit of the brushless type already available for the rotating synchronous machines, without any modification of principle. More precisely, the drive device that is to be interfaced with a motor position sensor, will feed the motor phases with sinusoidal currents that are always in phase with the motor e.m.f., thus generating a steady thrust to meet the need of the servo control.

More particularly, the symmetrical configuration of the air gap assures that the side thrusts of the magnetic attraction in every air gaps, generated in an equal and opposite manner at the two sides of the structure, are perfectly balanced in each module and only cause a residual torque laying in the plane of the lamination. Moreover such torques have a zero sum in the complete structure comprising all the modules. The side thrusts are therefore neutralized thanks to the two opposite air gaps and to the magnetic structure through which the same magnetic flux passes.

It is to be noted that in the present structure, differently from the hybrid structures used today, the magnetic flux always lays in a plane, thus allowing for the use of laminates of conventional magnetic material.

The motor can be completed by a similar magnetic structure which is used as a linear sensor position or resolver. As a non limiting example, a linear resolver which uses as a metric line the indented rails, can be realized with the same magnetic components described with reference to FIG. 1, wherein the permanent magnets 12, 13, 14 are replaced with coils or bobbins of the same sizes connected in series to each other. The machine so obtained is quite similar to a sensor of the resolver or synchro type wherein the bobbins in series represent the rotor single-phase winding (or excitation winding for the transmitter configuration), whereas the bobbins corresponding to the motor windings correspond to the stator or phase winding. Two-phase or three-phase embodiments are also possible.

Finally it is possible, thanks to the very small field levels of these sensors, to give up the motor symmetry in the sensor area to reduce the overall size of the machine and to limit the interactions of the axial resolver with only one of the rails.

The permanent magnets used can be of the rare earths, FeNd or ferrite types according to the required performances.

Although the invention has been described with particular reference to a precise embodiment, it is not to be limited to this latter, and all the modifications, changes and simplifications such as a different number of phases, the use of a different type of position sensor, a composition of the windings and of the modules, or a change in the indentation profile which will be evident to the skilled in the art, will fall within the scope of the invention.

The reluctance linear motor with symmetric air gap of the invention is adapted to be marketed without a supporting frame and to be incorporated in the movable members by the manufacturer of the actuated member thanks to the high mechanical air gap and to the absence of side thrust.

I claim:

1. A hybrid linear motor providing for a high specific thrust, comprising two parallel rails and a rotor which is movable therebetween, characterized in that said rails are of a low loss ferromagnetic material, and laminated parallel to their plane, each carrying a series of regular indentations with an even pitch, the indentations being faring to each other and staggered by half pitch along the longitudinal direction, and in that the rotor comprises a plurality of identical pieces that are longitudinally staggered, each realizing a phase or a part of a phase.

2. A linear motor as claimed in claim 1, characterized in that each of said pieces comprises two pole shoes of a low loss ferromagnetic material, which are laminated parallel to the plane of the rails, having a thickness equal to that of the rails, and carrying on both sides an indented profile with the same pitch of that of the rails and symmetrical in respect to a longitudinal axis.

3. A linear motor as claimed in claim 2, characterized in that the pole shoes enclose a permanent magnet and are surrounded by a winding the plane of which is parallel to the machine longitudinal axis and orthogonal to the plane of the rails.

4. A linear motor as claimed in claim 1 characterized in that it comprises three members, each made up by two pole shoes and mechanically connected together.

5. A linear motor as claimed in claim 3, characterized in that it incorporates a linear resolver which employs the same core laminations of the motor by replacing the permanent magnets with excitation bobbins.

6. A linear motor as claimed in claim 3, characterized in that it incorporates a reluctance linear resolver which employs as a metric line the indented rails of the stator section.

7. A linear motor as claimed in claim 1, characterized in that it provides two opposed air gaps and a symmetrical magnetic structure through which the same flux gasses in order to neutralize the side thrusts.

* * * * *